US 9,647,841 B1

(12) United States Patent
Thadishetty et al.

(10) Patent No.: US 9,647,841 B1
(45) Date of Patent: May 9, 2017

(54) SYSTEM AND METHOD FOR AUTHORIZING USAGE OF NETWORK DEVICES

(71) Applicant: Juniper Networks, Inc., Sunnyvale, CA (US)

(72) Inventors: Venkanna Thadishetty, Bangalore (IN); Ravindranath C. Kanakarajan, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 43 days.

(21) Appl. No.: 14/871,228

(22) Filed: Sep. 30, 2015

(51) Int. Cl.
*H04L 9/32* (2006.01)
*H04L 29/06* (2006.01)

(52) U.S. Cl.
CPC .......... *H04L 9/3234* (2013.01); *H04L 9/3247* (2013.01); *H04L 63/08* (2013.01); *H04L 63/083* (2013.01)

(58) Field of Classification Search
CPC ...... H04L 9/3234; H04L 63/08; H04L 63/083
See application file for complete search history.

(56) References Cited

U.S. PATENT DOCUMENTS

2007/0109989 A1* 5/2007 Nakagawa ............ H04W 84/20
370/328
2012/0233428 A1* 9/2012 Bacastow ............... G06F 21/78
711/163
2015/0254193 A1* 9/2015 Priest .................... G06F 13/385
715/835
2016/0164694 A1* 6/2016 Hyun ...................... H04L 12/12
348/14.08

OTHER PUBLICATIONS

"Digital signature", https://en.wikipedia.org/wiki/Digital_signature, as accessed Aug. 27, 2015, Wikipedia, (Dec. 9, 2003).
"Trusted Platform Module", https://en.wikipedia.org/wiki/Trusted_Platform_Module, as accessed Aug. 27, 2015, Wikipedia, (Jul. 6, 2004).
"Small form-factor pluggable transceiver", https://en.wikipedia.org/wiki/Small_form-factor_pluggable_transceiver, as accessed Aug. 27, 2015, Wikipedia, (Jul. 23, 2009).

* cited by examiner

*Primary Examiner* — Techane Gergiso
(74) *Attorney, Agent, or Firm* — FisherBroyles, LLP (57) ABSTRACT

The disclosed system may include (1) a detection module, stored in memory, that detects that a user is attempting to operate a network peripheral device configured for connecting into a base network device, at least one of the network peripheral device and the base network device including a trusted platform module that further includes an endorsement key that identifies the trusted platform module, (2) an obtaining module, stored in memory, that obtains a digitally signed indication that the user is authorized by a vendor to operate the network peripheral device, (3) an enablement module, stored in memory, that enables the user to operate the network peripheral device based on obtaining the digitally signed indication that the user is authorized by the vendor to operate the network peripheral device, and (4) at least one physical processor configured to execute these modules. Various other systems and methods are also disclosed.

20 Claims, 6 Drawing Sheets

SYSTEM AND METHOD FOR AUTHORIZING USAGE OF NETWORK DEVICES

BACKGROUND

Network device vendors typically seek to ensure that those who attempt to use the network devices are authorized purchasers. For example, network device vendors may provide extensive support and other resources for authorized purchasers. Nevertheless, some individuals or organizations may attempt to use the network devices without authorization. For example, these individuals or organizations may spoof authorized purchasers. Similarly, these individuals or organizations may clone some network devices to spoof the original and authorized network devices purchased from the vendors. More specifically, vendors may encode network device EEPROMs with specific vendor, model, or product instance codes, which unauthorized users may simply replicate to thereby circumvent the authorization policy.

In each of the cases described above, those who attempt to circumvent the authorization policy may potentially undermine the business models of the network device vendors. Additionally, these individuals may also unduly burden the network device vendors with unauthorized support, debugging, replacement, maintenance, and other assistance requests. These problems may especially arise in the case of routers and small form-factor pluggable transceivers, as discussed further below. In view of the above, the instant disclosure identifies and addresses a need for additional and improved systems and methods for authorizing usage of network devices.

SUMMARY

As will be described in greater detail below, the instant disclosure generally relates to systems and methods for authorizing usage of network devices. In one example, a system for accomplishing such a task may include (1) a detection module, stored in memory, that detects that a user is attempting to operate a network peripheral device configured for connecting into a base network device, at least one of the network peripheral device and the base network device including a trusted platform module that further includes an endorsement key that identifies the trusted platform module, (2) an obtaining module, stored in memory, that obtains an indication that the user is authorized by a vendor to operate the network peripheral device where (A) the indication is digitally signed by the vendor, (B) the vendor includes a vendor for at least one of the network peripheral device and the base network device, and (C) the indication indicates that the vendor has authorized a match between at least one of (i) the user and the endorsement key and (ii) the network peripheral device and the base network device, and (3) an enablement module, stored in memory, that enables the user to operate the network peripheral device based on obtaining the digitally signed indication that the user is authorized by the vendor to operate the network peripheral device. The system may also include at least one physical processor that is configured to execute one or more of these modules.

Similarly, a method for accomplishing the above-described task may include (1) detecting that a user is attempting to operate a network peripheral device configured for connecting into a base network device, at least one of the network peripheral device and the base network device including a trusted platform module that further includes an endorsement key that identifies the trusted platform module, (2) obtaining an indication that the user is authorized by a vendor to operate the network peripheral device where (A) the indication is digitally signed by the vendor, (B) the vendor includes a vendor for at least one of the network peripheral device and the base network device, and (C) the indication indicates that the vendor has authorized a match between at least one of (i) the user and the endorsement key and (ii) the network peripheral device and the base network device, and (3) enabling the user to operate the network peripheral device based on obtaining the digitally signed indication that the user is authorized by the vendor to operate the network peripheral device.

In some examples, the above-described method may be encoded as computer-readable instructions on a non-transitory computer-readable medium. For example, a computer-readable medium may include one or more computer-executable instructions that, when executed by at least one processor of a computing device, cause the computing device to: (1) detect that a user is attempting to operate a network peripheral device configured for connecting into a base network device, at least one of the network peripheral device and the base network device including a trusted platform module that further includes an endorsement key that identifies the trusted platform module, (2) obtain an indication that the user is authorized by a vendor to operate the network peripheral device where (A) the indication is digitally signed by the vendor, (B) the vendor includes a vendor for at least one of the network peripheral device and the base network device, and (C) the indication indicates that the vendor has authorized a match between at least one of (i) the user and the endorsement key and (ii) the network peripheral device and the base network device, and (3) enable the user to operate the network peripheral device based on obtaining the digitally signed indication that the user is authorized by the vendor to operate the network peripheral device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various systems and methods for authorizing usage of network devices. As will be explained in greater detail below, embodiments of the instant disclosure may enable vendors of network computing devices to more effectively determine whether attempted usage of a specific device is authorized or not. Similarly, embodiments of the instant disclosure may also enable the vendors to prevent unauthorized usage of their network computing devices. To achieve these benefits, the vendors may bind network devices to each other and/or to customers by referencing unique identifiers, such as endorsement keys encoded within trusted platform modules, as discussed further below.

Figure 1:
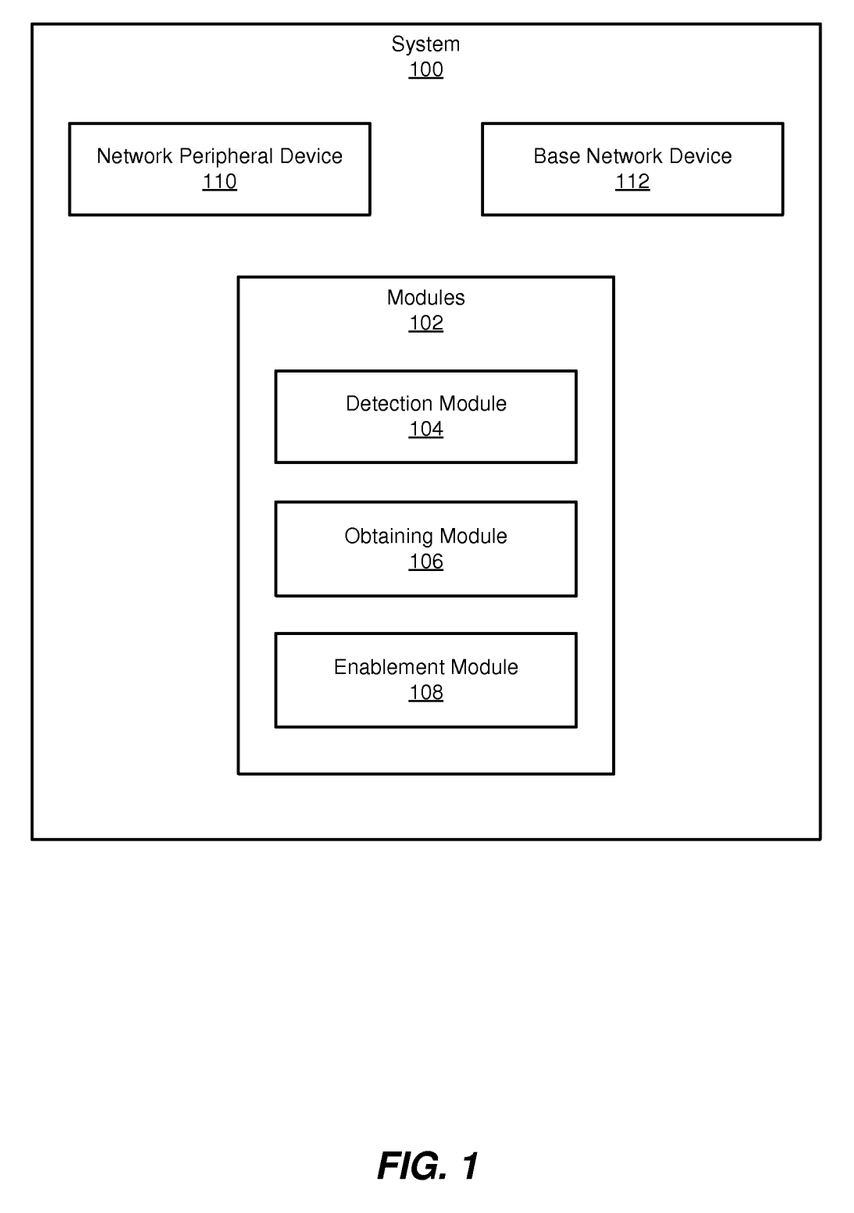
FIG. 1 is a block diagram of an exemplary system for authorizing usage of network devices.
Figure 2:
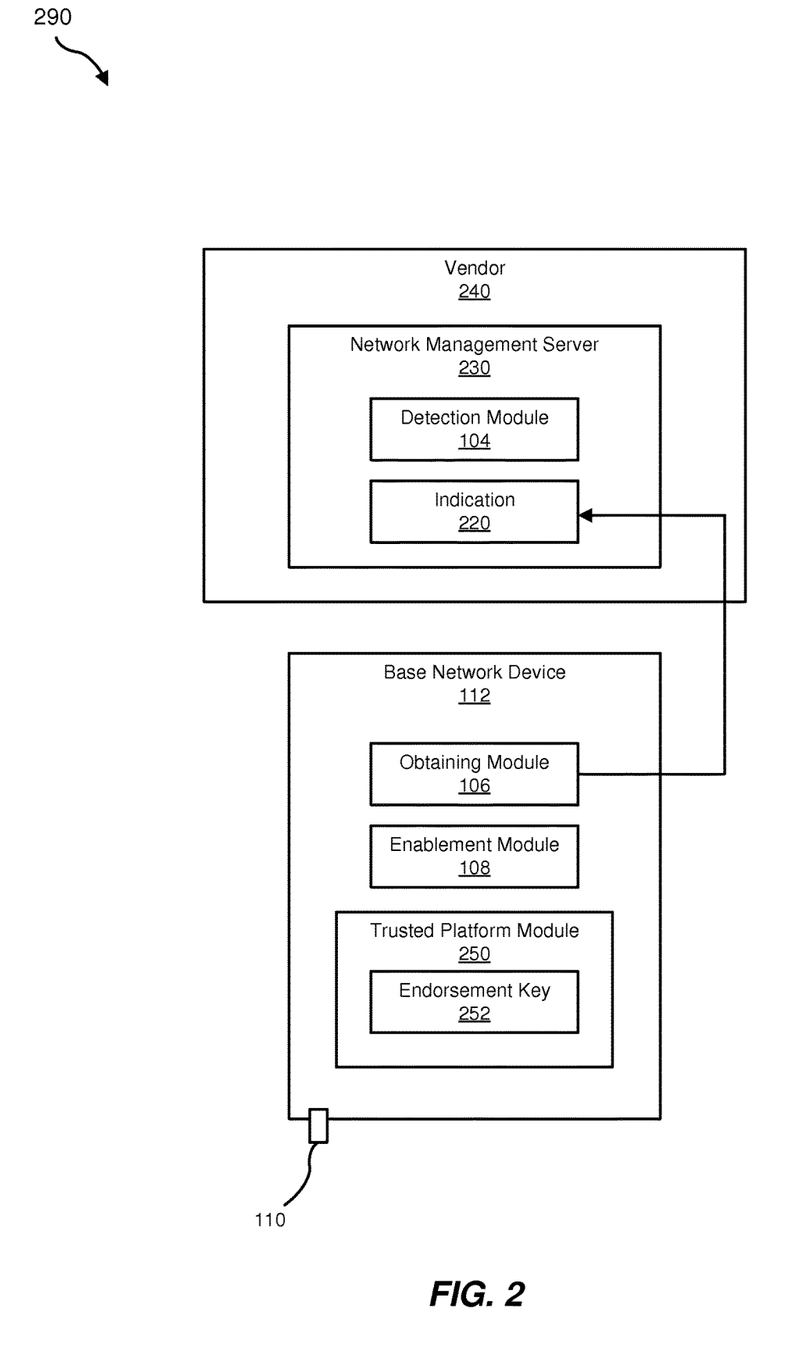
FIG. 2 is a block diagram of an exemplary system for authorizing usage of network devices.

The following will provide, with reference to FIGS. 1-2, examples of exemplary systems for authorizing usage of network devices. Similarly, the following will provide, with reference to FIGS. 3 and 4 examples of a flow diagram and a timing diagram corresponding to the exemplary systems for authorizing usage of network devices. Moreover, the following will also provide, with reference to FIG. 5, multiple examples of digitally signed indications that network devices are authorized to operate with each other and/or with a specified customer. Finally, the discussion corresponding to FIG. 6 will provide numerous examples of systems that may include the components shown in FIGS. 1-5.

FIG. 1 is a block diagram of an exemplary system 100 for authorizing usage of network devices. As illustrated in this figure, exemplary system 100 may include a network peripheral device 110 and a base network device 112. As used herein, the term "network peripheral device" generally refers to a smaller or supplemental device configured for connecting to, or insertion within, a base network device to supplement the functionality of the base network device as a peripheral device. Notably, in many examples the network peripheral device will lack one or more microprocessors, which may prevent it from actively executing one or more steps of method 300. In these cases, one or more of the steps, such as requesting, obtaining, verifying, transmitting, comparing, decrypting, and/or enabling, maybe performed by the base network device or a corresponding network management server, as discussed further below. In other examples, the network peripheral device may contain its own microprocessor, which may enable it to perform one or more of the steps in a manner parallel to how the base network device would perform these steps.

Moreover, the term "base network device" generally refers to any network device configured to receive a network peripheral device. In exemplary embodiments, the network peripheral device may correspond to a small form-factor pluggable transceiver and the base network device may correspond to a router, such as a JUNIPER JUNOS router.

As further illustrated in FIG. 1, system 100 may also include one or more modules 102 for performing one or more tasks. For example, and as will be explained in greater detail below, exemplary system 100 may include a detection module 104, stored in memory, that detects that a user is attempting to operate a network peripheral device configured for connecting into a base network device. At least one of the network peripheral device and the base network device may include a trusted platform module that further includes an endorsement key that identifies the trusted platform module. System 100 may also include an obtaining module 106, stored in memory, that obtains an indication that the user is authorized by a vendor to operate the network peripheral device. The indication may be digitally signed by the vendor. The vendor may include a vendor for at least one of the network peripheral device and the base network device. Moreover, the indication may indicate that the vendor has authorized a match between at least one of (1) the user and the endorsement key and (2) the network peripheral device and the base network device (e.g., as identified by one or both of their endorsement keys). Additionally, system 100 may include an enablement module 108, stored in memory, that enables the user to operate the network peripheral device based on obtaining the digitally signed indication that the user is authorized by the vendor to operate the network peripheral device.

As shown in FIG. 2, in some examples, system 100 may constitute part of a larger networking system 290. System 290 may include or involve a vendor 240, which may maintain a network management server 230. In various embodiments, system 100 may determine whether usage of network peripheral device 110 and/or base network device 112 is authorized either (1) based on communications just between network peripheral device 110 and base network device 112 or (2) based on communications between one of these network devices and network management server 230, as discussed further below. In the specific example of FIG. 2, network management server 230 may include detection module 104. Network management server 230 may also include indication 220, which may be obtained by obtaining module 106 according to method 300, as discussed further below. In this specific example, base network device 112 may include obtaining module 106 and enablement module 108. Base network device 112 may also include a trusted platform module 250 that further includes an endorsement key 252.

In the specific example of FIG. 2, detection module 104 may detect that a user is attempting to operate network peripheral device 110, which is configured for connecting into base network device 112. Moreover, obtaining module 106 may obtain indication 220 from network management server 230 that the user is authorized by vendor 240 to operate network peripheral device 110. Indication 220 may be digitally signed by vendor 240. Vendor 240 may constitute a vendor for network peripheral device 110 and/or base network device 112. Additionally, indication 220 may indicate that vendor 240 has authorized a match between at least one of (1) the user and endorsement key 252 and (2) network peripheral device 110 and base network device 112. Furthermore, enablement module 108 may enable the user to operate network peripheral device 110 based on obtaining digitally signed indication 220 that the user is authorized by vendor 240 to operate network peripheral device 110.

In the example of FIG. 2, detection module 104 is located within network management server 230 whereas obtaining module 106 and enablement module 108 are located within base network device 112. Nevertheless, in other examples, one or more of these modules may be located within any one or more of network management server 230, base network device 112, and/or network peripheral device 110 according to any suitable permutation that performs the intended functionality of method 300, as described further below. Additionally, one or both of base network device 112 and network peripheral device 110 may contain a trusted platform module and corresponding endorsement key that system 100 may reference to verify binding and authorized usage, as additionally described below.

Figure 3:
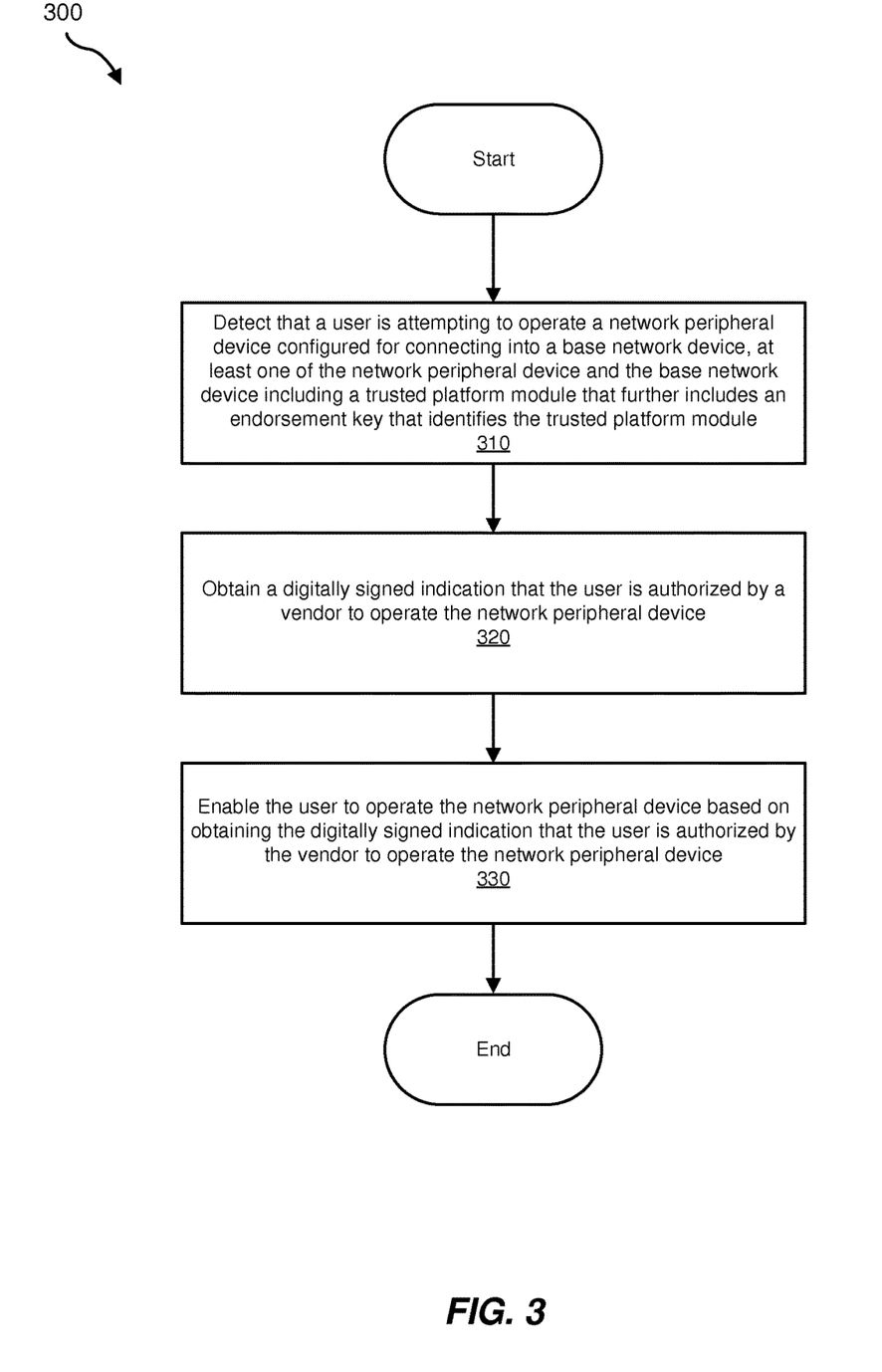
FIG. 3 is a flow diagram of an exemplary method for authorizing usage of network devices.

FIG. 3 is a flow diagram of an exemplary computer-implemented method 300 for authorizing usage of network devices. Some or all of the steps shown in FIG. 3 may be performed by any suitable computer-executable code and/or computing system (e.g., in cooperation with a network administrator). In some embodiments, the steps shown in FIG. 3 may be performed by one or more of the components of system 100 in FIG. 1, system 290 in FIG. 2, and/or portions of exemplary computing system 600 in FIG. 6.

As illustrated in FIG. 3, at step 310, one or more of the systems described herein may detect that a user is attempting to operate a network peripheral device configured for connecting into a base network device. For example, detection module 104 may detect that a user is attempting to operate network peripheral device 110 configured for connecting into base network device 112.

One or both of these devices may include a trusted platform module that further includes an endorsement key that identifies the respective trusted platform module, as discussed above. As used herein, the term "trusted platform module" generally refers to any secure cryptoprocessor, which is a dedicated microprocessor designed to secure hardware by integrating cryptographic keys into devices. In some examples, the trusted platform module may be configured according to the technical specifications of the TRUSTED COMPUTING GROUP. Moreover, as used herein, the term "endorsement key" generally refers to the endorsement key, as an asymmetric cryptographic key, within a trusted platform module that uniquely identifies the trusted platform module using the cryptoprocessor to verify authenticity and the identity of the network device.

Detection module 104 may detect that the user is attempting to operate the network peripheral device in a variety of ways. For example, detection module 104 may, as part of network management server 230, detect a request from network peripheral device 110 and/or base network device 112 for indication 220. In other words, one of these network devices may request confirmation from network management server 230 that the user is authorized to operate the corresponding network device. One of these network devices may transmit the request in response to detecting that the user has plugged network peripheral device 110 into base network device 112.

In other examples, detection module 104 may, as part of network peripheral device 110 and/or base network device 112, detect that the user has plugged network peripheral device 110 into base network device 112. System 100 may perform the remainder of method 300 in response to detecting that the user has plugged network peripheral device 110 into base network device 112.

Returning to FIG. 3, at step 320, one or more of the systems described herein may obtain a digitally signed indication that the user is authorized by the vendor to operate the network peripheral device and/or base network device. For example, obtaining module 106 may obtain indication 220 indicating that the user is authorized by vendor 240 to operate network peripheral device 110 and/or base network device 112 (e.g., in conjunction with each other). As used herein, the term "digitally signed indication" generally refers to any data stored within memory that is digitally signed, according to asymmetric cryptography, by the vendor (or other seller, user, or administrator) and that is configured, within the larger context of a network environment, to indicate to a network security system, such as system 100, that operation of a network device is authorized based on a match between the network device and a customer of the network device or based on a match between the network device and another network device, in accordance with method 300.

Figure 5:
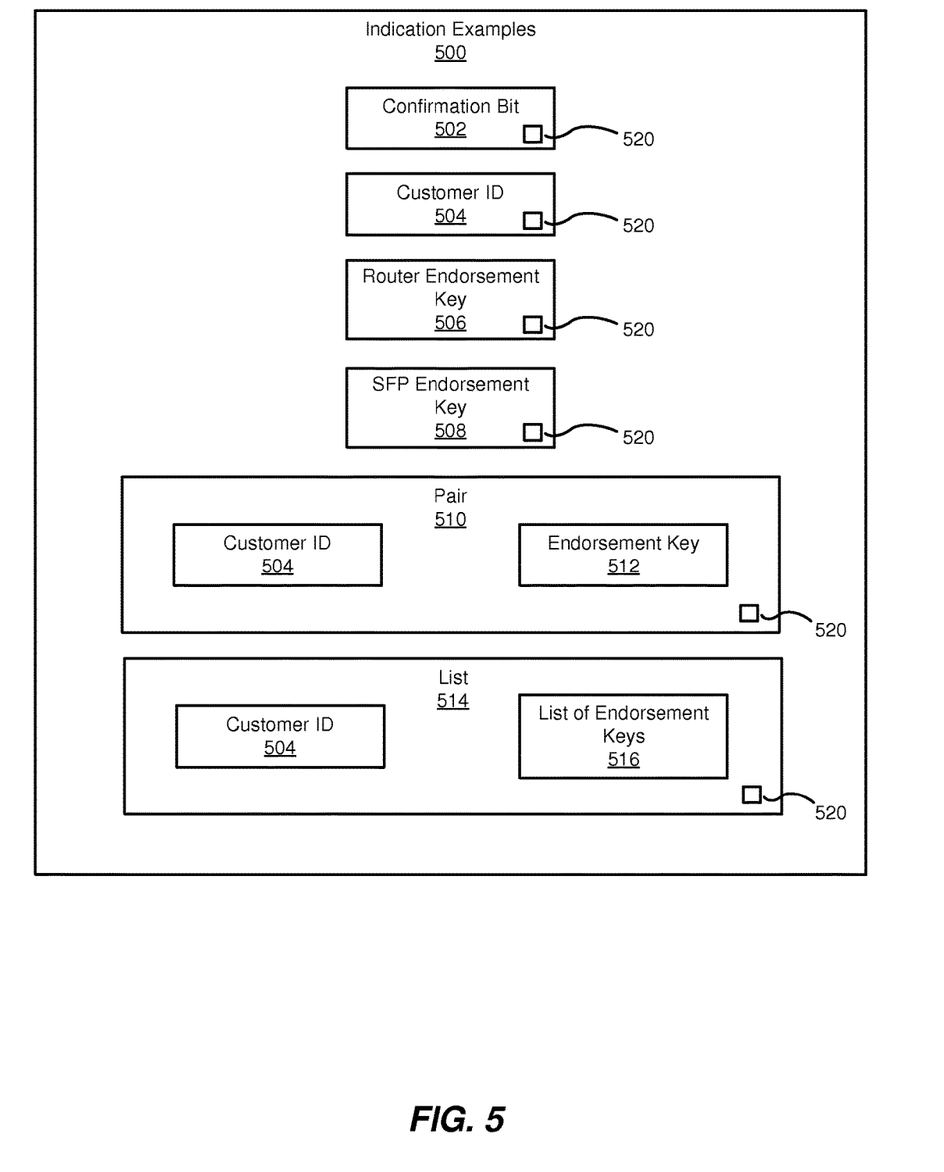
FIG. 5 is an exemplary block diagram of examples of digitally signed indications referenced by the system for authorizing usage of network devices.

In some examples, the indication may simply be stored within one device and identify another device, thereby indicating a match between the two devices. In other examples, the indication may simply be stored within one device and identify a customer of the device, thereby indicating a match between the customer and the device. In other examples, the indication may explicitly identify both items that match as a pair (e.g., the device and the customer or the device and the other device). In further examples, the indication may identify an entire set of customers and/or devices that match an entire other set of devices. Further examples of the indication are illustrated in FIG. 5, as further discussed below. Notably, any one of these examples of digitally signed indications may be stored within any one of the network peripheral device, the base network device, and/or the network management server, according to any suitable permutation. Moreover, in alternative examples, the indication may be encrypted by the vendor without necessarily being digitally signed.

Obtaining module 106 may obtain indication 220 in a variety of ways. In general, the indication may be digitally signed by the vendor using a private key. Accordingly, in some embodiments, the network peripheral device and/or the base network device may store a copy of the public key for the vendor that corresponds to the private key used to digitally sign the indication. Additionally, the vendor may program the public key into the trusted platform module of any one of these network devices to enable the corresponding network device to verify authorship of the indication.

Furthermore, any one of these network devices may be programmed to verify the integrity of the public key using a public key infrastructure (e.g., a certificate authority accessible over the Internet or wide area network). Moreover, as a preliminary and basic form of protection, one or more of the network devices may attempt to decrypt, using the public key of the vendor, one or more items of information that are purported to be digitally signed by the vendor using the public key of the vendor. If the item of information cannot be decrypted using the public key, then the corresponding network device may determine that the digital signature is false or spoofed and enablement module 108 may prevent operation of the network device.

Notably, in addition to storing indication 220, which may indicate that operation of the device is authorized based on a match between one device and a customer or between the device and another device, each network device may also store further contextual information about itself. The further contextual information may include the device serial number, the customer identifier and other customer data, etc. In some examples, the customer identifier or other data may correspond to a customer certificate (e.g., according to a public key infrastructure). The further contextual information may also be digitally signed by the vendor, as outlined above. Moreover, each network device may also decode the digitally signed contextual information using the public key of the vendor.

In cases where indication 220 and/or the contextual information is stored within the network peripheral device, then the base network device may obtain this information through either of two mechanisms. First, this information may be memory mapped to the base network device using memory mapping. Additionally, or alternatively, this information may be transmitted to the base network device by the network peripheral device. The transmitted information may remain digitally signed upon receipt by the base network device such that the base network device may decrypt it using another copy of the public key. Alternatively, the transmitted information may already be decrypted by the network peripheral device using its copy of the public key (e.g., in cases where the network peripheral device contains more robust microprocessor functionality). Moreover, the network peripheral device may transmit the information to the base network device in response to a request or command from the base network device.

Figure 4:
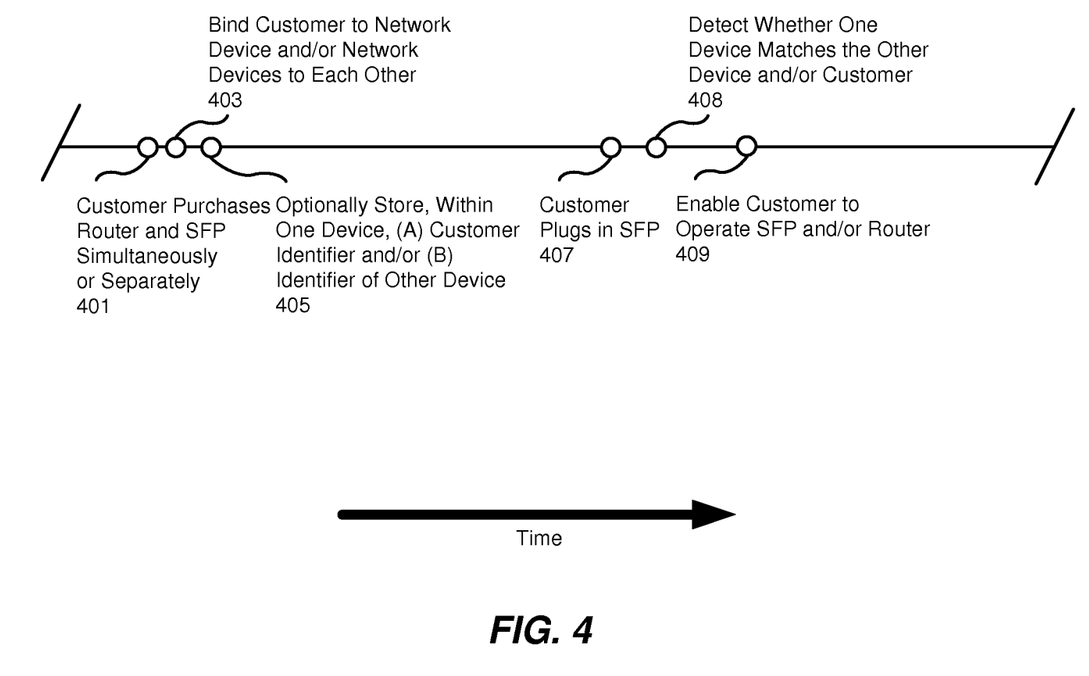
FIG. 4 is a timing diagram that corresponds to an exemplary system for authorizing usage of network devices.

In general, obtaining module 106 may obtain indication 220 in response to detecting that the user is attempting to operate network peripheral device 110 and/or base network device 112. FIG. 4 illustrates an exemplary timeline for authorizing usage of network devices, which may correspond to method 300. At step 401, a customer may purchase a router and/or a transceiver. The customer may purchase these network devices separately or simultaneously. Next, at step 403, system 100 and/or vendor 240 may bind the customer to one or both network devices. Additionally, or alternatively, system 100 and/or vendor 240 may bind the two network devices to each other. As used herein, the phrase "bind" generally refers to specifying, within a register, that two entities are associated with each other and authorized to operate together. In general, system 100 may bind an original network device to a customer and/or to another network device by referencing the endorsement key for the original network device and/or the endorsement key for the other network device. Because endorsement keys are unique, the binding should enable system 100 to accurately determine whether a user or customer is authorized to operate a specific network device identified by the corresponding endorsement key.

Furthermore, at step 405, system 100 may optionally store a customer identifier and/or an identifier of the transceiver within the router (or vice versa). In these examples, system 100 may digitally sign one or both of these identifiers. Additionally, or alternatively, system 100 may store one or both of these identifiers within the device EEPROM (or any other non-volatile and/or read-only memory). In other examples, system 100 may store one or both of these identifiers using the trusted platform module, which may optionally store one or both identifiers within itself or outside of itself. Moreover, network management server 230 may also store one or both of these identifiers within a centralized registry for vendor 240 to perform the binding and indicate which users are authorized to operate which network devices.

At step 407, the customer may plug the transceiver into the router, which may be detected by detection module 104, as discussed above. Plugging the transceiver into the router may trigger the obtaining of indication 220 and the attempt to determine whether the operation of the network device(s) is authorized in accordance with method 300. Subsequently, at step 408, obtaining module 106 and/or enablement module 108 may detect whether one network device matches another network device and/or matches the customer, as further discussed below.

FIG. 5 shows several indication examples 500 of indication 220, which may verify that the user is authorized to operate one or more network devices. For example, obtaining module 106 may, as part of network peripheral device 110 and/or base network device 112, obtain one or more confirmation bits, such as confirmation bit 502, indicating that network management server 230 confirms that the user is authorized to operate one or more network devices. Specifically, the user authorized by confirmation bit 502 may be the user identified by an identifier of the user or customer that was encoded within the network device at the time of purchase and digitally signed by vendor 240. Similarly, confirmation bit 502 may confirm that one network device is authorized to operate with another network device. For example, confirmation bit 502 may confirm that an original network device seeking confirmation from network management server 230 is authorized to operate with another network device as identified by its endorsement key.

Notably, digital signing of confirmation bit 502 may be optional and, instead, one or more of the items of information transmitted to the network management server (e.g., the identifiers of the network device(s) and/or customer) may be previously digitally signed by the vendor and/or encoded within one or more network devices. In these cases, one or more of the identifiers may correspond to indication 220.

Additionally, or alternatively, obtaining module 106 may, as part of network peripheral device 110 and/or base network device 112, seek indication 220 within network peripheral device 110 and/or base network device 112 (e.g., within the same device or within the other device). In these examples, indication 220 may indicate that these two devices are authorized to operate with each other. For example, network peripheral device 110 may include an identifier of base network device 112, such as a router endorsement key 506, where the identifier has been digitally signed by vendor 240 as indicated by digital signature 520. Additionally, or alternatively, base network device 112 may include an identifier of network peripheral device 110, such as a transceiver (e.g., "SFP") endorsement key 508, where the identifier has been digitally signed by vendor 240 as indicated by another instance of digital signature 520.

In similar examples, indication 220 may indicate that network peripheral device 110 and base network device 112 were purchased by the same customer. For example, one or both devices may include an encoded identifier, such as a customer ID 504, of the customer that purchased the corresponding device where the identifier has been digitally signed by vendor 240. Obtaining module 106 may confirm that both devices are encoded with the same customer ID 504. In other words, indication 220 may indicate that the vendor has authorized a match between a customer of the network peripheral device and a customer of the base network device.

In further examples, indication 220 may indicate that a purchaser of one of these devices is authorized to operate the device that the purchaser purchased (i.e., one or both devices). For example, a pair 510 of items of information, including customer ID 504 and an endorsement key 512, may indicate that the customer corresponding to customer ID 504 is authorized to operate the device corresponding to endorsement key 512. In additional examples, one or both of these devices may include a set of one or more device identifiers, such as a list 214 that includes a list of endorsement keys 516, which specify devices that a corresponding customer (as identified by customer ID 504) is authorized to operate.

In general, obtaining module 106 may obtain any one or more of indication examples 500 from any permutation of network peripheral device 110, base network device 112, and/or network management server 230 that suitably performs the authorization functions of method 300. Moreover, any device that lacks indication 220 may seek it from another one of these three devices that does possess or potentially possesses indication 220. Similarly, any device that does possess indication 220 may share indication 220 with another device that lacks it, either preemptively or in response to a request from the other device.

As outlined above, one network device may include a digitally signed identifier of customers and/or other network devices that the network device is authorized to operate with. In general, vendor 240 may encode one or both of these identifiers within the network device (e.g., within nonvolatile memory and/or read-only memory, such as an EEPROM) at the time that the network device is purchased and/or manufactured. Notably, if one device is purchased before the other device, then the vendor may not yet know the identity of the other device. In that case, the vendor may be able to encode the original device with the identifier of the customer but not necessarily encode the original device with the identifier of the other device. In other examples, if both devices are purchased at the same time, or if a second device is purchased after a first device, then the vendor may encode the new device with both the identifier of the customer and/or the identifier of the previously purchased device. In other words, the vendor may have stored the digitally signed indication indicating a match between two devices within at least one of the two devices using the trusted platform module at a time of purchasing together the two devices (or at a time of the later purchase, if purchased separately).

In all of these cases, the vendor may digitally sign the identifier of the customer and/or the identifier of the other device (e.g., the endorsement key). Moreover, the trusted platform module of the receiving device may store one or both of these items of information within itself or outside of itself.

In further examples, network peripheral device 110 and/or base network device 112 may obtain any one of indication examples 500 from network management server 230 to additionally, or alternatively, verify whether operation of the corresponding network device is authorized. For example, network peripheral device 110 and/or base network device 112 may obtain any one of indication examples 500 from network management server 230 to determine when operation of itself is authorized and/or when operation of the other device is authorized.

In further examples, system 100 may verify, not just a match between one device and a customer or another device, but also that the device has not been cloned to simulate authorized usage. For example, if one device contains digitally signed indication 220, then a cloned device may simply copy digitally signed indication 220 to thereby spoof or simulate authorized usage. This problem may especially arise in the situation where verification is performed between the router and the transceiver without necessary communication to the network management server. To address this problem, the network management server may register, not just a match between one device and a customer or another device, but also instances of detected matches or operations. For example, upon first receiving an authorization request from one network device, the network management server may record this authorization request and/or device operation within a register. In general, in these examples, obtaining module 106 may transmit, to a network management server of the vendor, identifiers of at least one of (A) both the user and the endorsement key and (B) both the network peripheral device and the base network device. Obtaining module 106 may also receive, in response to transmitting, verification of whether the indication has been spoofed by copying the indication from one location to another location.

Notably, in these examples, the network management server may also request or record other contextual information, such as time, day, calendar, location, geolocation, payment, purchase, and/or customer information at the time of the first request. The network management server may index the registered information according to one or more of these items of contextual information. Subsequently, the network management server may receive a second authorization request, or other indication of operation of the same network device. Upon receiving the second authorization request, the network management server may detect that the same network device has potentially been cloned and/or spoofed. The network management server may also attempt to verify whether the network device has been cloned and/or spoofed, such as by referencing the contextual metadata described above. In these examples, the network management server may only issue authorization approvals to one of the requests to operate the network device (e.g. at the same time or during a same period of time), thereby ensuring that only one instance of authorized usage exists corresponding to the actual purchase of the network device.

System 100 may additionally, or alternatively, attempt to prevent the cloning or spoofing of network devices in other ways. For example, obtaining module 106 may prompt for the user to provide a password that is unique to the network peripheral device in response to inserting the network peripheral device. Moreover, enablement module 108 may condition the enabling of the user to operate the network peripheral device on successful receipt of the password, as discussed further below regarding step 330. In one specific example, obtaining module 106 may verify whether the password is successfully received by attempting to decrypt the password using the endorsement key of the trusted platform module (e.g., the trusted platform module of the transceiver). Notably, receipt of the password may unlock one or more keys stored within the trusted platform module, such as the public key of the vendor. Upon unlocking and/or selecting the public key, the device may then use the public key to decrypt indication 220 and/or the related contextual information that was digitally signed by the vendor and stored within the device (e.g., stored within the device EEPROM).

In other examples, the base network device may use its trusted platform module to generate random numbers as the basis for challenges from the base network device to the network peripheral device. In response, the network peripheral device may use its encrypted information (e.g., one or more digitally signed indications corresponding to indication 220) with the received random number(s) sent from the base network device to prevent cloning, spoofing, and/or other replay attacks.

In further examples, obtaining module 106 may provide, through remote attestation and in response to the network peripheral device being connected into the base network device, a signature of at least one of the network peripheral device and the base network device to a network management server of the vendor. The signature may be based on the remote attestation and verify the identity of the network peripheral device and/or the base network device. Additionally, obtaining module 106 may receive, from the network management server and in response to the remote attestation, the digitally signed indication that the user is authorized by the vendor to operate the network peripheral device.

Returning to FIG. 3, at step 330, one or more of the systems herein may enable the user to operate the network peripheral device based on obtaining the digitally signed indication that the user is authorized by the vendor to operate the network peripheral device. For example, enablement module 108 may enable the user to operate network peripheral device 110 based on obtaining digitally signed indication 220 that the user is authorized by vendor 240 to operate network peripheral device 110.

As used herein, the phrase "enable the user" generally refers to (1) disarming a previously armed software or hardware network security measure configured to prevent unauthorized use of network devices and/or (2) selectively failing to arm the network security measure. The network security measure may be software or hardware encoded within one or both of network peripheral device 110 and base network device 112. Additionally, or alternatively, confirmation bit 502 may constitute a signal to disarm the security measure or selectively failed to arm the security measure, as further discussed above. In other words, indication 220 that two entities are authorized to operate together may also constitute an instruction to disarm, or selectively fail to arm, the security measure or component. In further examples, the network peripheral device and/or base network device may be structurally configured to be inoperable without confirmation that operation of the corresponding device is authorized according to method 300.

In general, the security measure may block or inhibit one or both of the transceiver and the router from operating. In some examples, the security measure may only block or inhibit operation of a network device under conditions that are unauthorized by the vendor. In other examples, the security measure may temporarily, permanently, or semi-permanently inhibit or block operation of a network device. Furthermore, the security measure may prompt or notify the user, an administrator, and/or the vendor of one or more attempts to perform authorized and/or unauthorized operation of a network device, as determined according to method 300. Notably, step 330 of method 300 may also correspond to step 409 in FIG. 4, which further shows that system 100 may enable the user to operate the transceiver and/or the router.

As explained above, embodiments of the instant disclosure may enable vendors of network computing devices to more effectively determine whether attempted usage of a specific device is authorized or not. Similarly, embodiments of the instant disclosure may also enable the vendors to prevent unauthorized usage of their network computing devices. To achieve these benefits, the vendors may bind network devices to each other and/or to customers by referencing unique identifiers, such as endorsement keys encoded within trusted platform modules.

Figure 6:
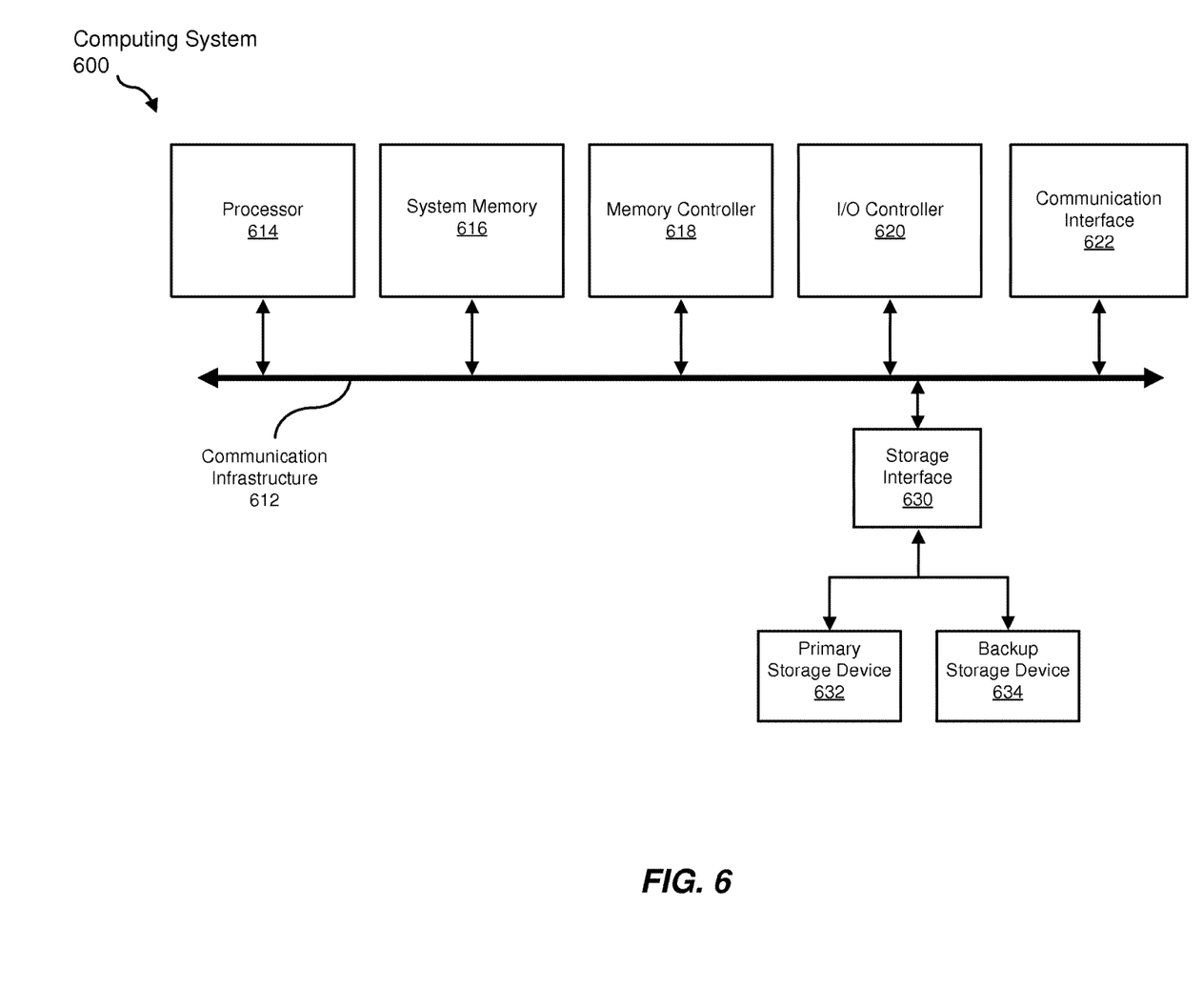
FIG. 6 is a block diagram of an exemplary computing system capable of implementing and/or being used in connection with one or more of the embodiments described and/or illustrated herein.

FIG. 6 is a block diagram of an exemplary computing system 600 capable of implementing and/or being used in connection with one or more of the embodiments described and/or illustrated herein. In some embodiments, all or a portion of computing system 600 may perform and/or be a means for performing, either alone or in combination with other elements, one or more of the steps described in connection with FIG. 3. All or a portion of computing system 600 may also perform and/or be a means for performing and/or implementing any other steps, methods, or processes described and/or illustrated herein. In one example, computing system 600 may include or correspond to system 100 from FIG. 1.

Computing system 600 broadly represents any type or form of electrical load, including a single or multi-processor computing device or system capable of executing computer-readable instructions. Examples of computing system 600 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 600 may be programmed, configured, and/or otherwise designed to comply with one or more networking protocols. According to certain embodiments, computing system 600 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 600 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 600 may include various network and/or computing components. For example, computing system 600 may include at least one processor 614 and a system memory 616. Processor 614 generally represents any type or form of processing unit capable of processing data or interpreting and executing instructions. For example, processor 614 may represent an application-specific integrated circuit (ASIC), a system on a chip (e.g., a network processor), a hardware accelerator, a general purpose processor, and/or any other suitable processing element.

Processor 614 may process data according to one or more of the networking protocols discussed above. For example, processor 614 may execute or implement a portion of a protocol stack, may process packets, may perform memory operations (e.g., queuing packets for later processing), may execute end-user applications, and/or may perform any other processing tasks.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 600 may include both a volatile memory unit (such as, for example, system memory 616) and a non-volatile storage device (such as, for example, primary storage device 632, as described in detail below). System memory 616 may be implemented as shared memory and/or distributed memory in a network device. Furthermore, system memory 616 may store packets and/or other information used in networking operations.

In certain embodiments, exemplary computing system 600 may also include one or more components or elements in addition to processor 614 and system memory 616. For example, as illustrated in FIG. 6, computing system 600 may include a memory controller 618, an Input/Output (I/O) controller 620, and a communication interface 622, each of which may be interconnected via communication infrastructure 612. Communication infrastructure 612 generally represents any type or form of infrastructure capable of facilitating communication between one or more components of a computing device. Examples of communication infrastructure 612 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 618 generally represents any type or form of device capable of handling memory or data or controlling communication between one or more components of computing system 600. For example, in certain embodiments memory controller 618 may control communication between processor 614, system memory 616, and I/O controller 620 via communication infrastructure 612. In some embodiments, memory controller 618 may include a Direct Memory Access (DMA) unit that may transfer data (e.g., packets) to or from a link adapter.

I/O controller 620 generally represents any type or form of device or module capable of coordinating and/or controlling the input and output functions of a computing device. For example, in certain embodiments I/O controller 620 may control or facilitate transfer of data between one or more elements of computing system 600, such as processor 614, system memory 616, communication interface 622, and storage interface 630.

Communication interface 622 broadly represents any type or form of communication device or adapter capable of facilitating communication between exemplary computing system 600 and one or more additional devices. For example, in certain embodiments communication interface 622 may facilitate communication between computing system 600 and a private or public network including additional computing systems. Examples of communication interface 622 include, without limitation, a link adapter, a wired network interface (such as a network interface card), a wireless network interface (such as a wireless network interface card), and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 622 may also represent a host adapter configured to facilitate communication between computing system 600 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also enable computing system 600 to engage in distributed or remote computing. For example, communication interface 622 may receive instructions from a remote device or send instructions to a remote device for execution.

As illustrated in FIG. 6, exemplary computing system 600 may also include a primary storage device 632 and/or a backup storage device 634 coupled to communication infrastructure 612 via a storage interface 630. Storage devices 632 and 634 generally represent any type or form of storage device or medium capable of storing data and/or other computer-readable instructions. For example, storage devices 632 and 634 may represent a magnetic disk drive (e.g., a so-called hard drive), a solid state drive, a floppy disk drive, a magnetic tape drive, an optical disk drive, a flash drive, or the like. Storage interface 630 generally represents any type or form of interface or device for transferring data between storage devices 632 and 634 and other components of computing system 600.

In certain embodiments, storage devices 632 and 634 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 634 may also include other similar structures or devices for allowing computer software, data, or other computer-readable instructions to be loaded into computing system 600. For example, storage devices 632 and 634 may be configured to read and write software, data, or other computer-readable information. Storage devices 632 and 634 may be a part of computing system 600 or may be separate devices accessed through other interface systems.

Many other devices or subsystems may be connected to computing system 600. Conversely, all of the components and devices illustrated in FIG. 6 need not be present to practice the embodiments described and/or illustrated herein. The devices and subsystems referenced above may also be interconnected in different ways from those shown in FIG. 6. Computing system 600 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or other networking functionality.

In addition, one or more of the modules described herein may transform data, physical devices, and/or representations of physical devices from one form to another. For example, one or more of the modules recited herein may receive one or more digitally signed indications, as discussed above, and/or associated configuration or contextual information, transform one or more of these items of information, such as by transforming a security state of a network device from enabled to disabled (or vice versa), store one or more of these items of data to a disk or other memory, use a result of transforming the data to protect network device vendors from unauthorized usage of their products, and output a result of the transformation to a display or other output device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:
    a detection module, stored in memory, that detects that a user is attempting to operate a network peripheral device configured for connecting into a base network device, at least one of the network peripheral device and the base network device comprising a trusted platform module that further comprises an endorsement key that identifies the trusted platform module;
    an obtaining module, stored in memory, that obtains an indication that the user is authorized by a vendor to operate the network peripheral device where:
        the indication is digitally signed by the vendor;
        the vendor comprises a vendor for at least one of the network peripheral device and the base network device; and
        the indication indicates that the vendor has authorized a match between at least one of:
            the user and the endorsement key; and
            the network peripheral device and the base network device;
    an enablement module, stored in memory, that enables the user to operate the network peripheral device based on obtaining the digitally signed indication that the user is authorized by the vendor to operate the network peripheral device; and
    at least one physical processor configured to execute the detection module, the obtaining module, and the enablement module.

2. The system of claim 1, wherein the network peripheral device comprises:
    the trusted platform module; and
    a small form-factor pluggable transceiver.

3. The system of claim 1, wherein the base network device comprises:
    the trusted platform module; and
    a router.

4. The system of claim 1, wherein the indication indicates that the vendor has authorized a match between the user and the endorsement key.

5. The system of claim 1, wherein the indication indicates that the vendor has authorized a match between the network peripheral device and the base network device.

6. The system of claim 5, wherein the indication indicates that the vendor has authorized a match between a customer of the network peripheral device and a customer of the base network device.

7. The system of claim 5, wherein the digitally signed indication was stored within read-only memory of at least one of the network peripheral device and the base network device at a time of purchasing together the network peripheral device and the base network device.

8. The system of claim 1, wherein:
    the obtaining module transmits, to a network management server of the vendor, identifiers of at least one of:
        both the user and the endorsement key; and
        both the network peripheral device and the base network device; and
    the obtaining module receives, in response to transmitting, verification of whether the indication has been spoofed by copying the indication from one location to another location.

9. The system of claim 1, wherein:
the obtaining module prompts for the user to provide a password that is unique to the network peripheral device in response to inserting the network peripheral device; and
the enablement module conditions the enabling of the user to operate the network peripheral device on successful receipt of the password.

10. The system of claim 1, wherein the obtaining module:
provides, through remote attestation and in response to the network peripheral device being connected into the base network device, a signature of at least one of the network peripheral device and the base network device to a network management server of the vendor; and
receives, from the network management server and in response to the remote attestation, the digitally signed indication that the user is authorized by the vendor to operate the network peripheral device.

11. A method comprising:
detecting that a user is attempting to operate a network peripheral device configured for connecting into a base network device, at least one of the network peripheral device and the base network device comprising a trusted platform module that further comprises an endorsement key that identifies the trusted platform module;
obtaining an indication that the user is authorized by a vendor to operate the network peripheral device connected into the base network device where:
the indication is digitally signed by the vendor;
the vendor comprises a vendor for at least one of the network peripheral device and the base network device; and
the indication indicates that the vendor has authorized a match between at least one of:
the user and the endorsement key; and
the network peripheral device and the base network device; and
enabling the user to operate the network peripheral device based on obtaining the digitally signed indication that the user is authorized by the vendor to operate the network peripheral device.

12. The method of claim 11, wherein the network peripheral device comprises:
the trusted platform module; and
a small form-factor pluggable transceiver.

13. The method of claim 11, wherein the base network device comprises:
the trusted platform module; and
a router.

14. The method of claim 11, wherein the indication indicates that the vendor has authorized a match between the user and the endorsement key.

15. The method of claim 11, wherein the indication indicates that the vendor has authorized a match between the network peripheral device and the base network device.

16. The method of claim 15, wherein the indication indicates that the vendor has authorized a match between a customer of the network peripheral device and a customer of the base network device.

17. The method of claim 15, wherein the digitally signed indication was stored within read-only memory of at least one of the network peripheral device and the base network device at a time of purchasing together the network peripheral device and the base network device.

18. The method of claim 11, wherein obtaining the digitally signed indication comprises:
transmitting, to a network management server of the vendor, identifiers of at least one of:
both the user and the endorsement key; and
both the network peripheral device and the base network device; and
receiving, in response to transmitting, verification of whether the indication has been spoofed by copying the indication from one location to another location.

19. The method of claim 11, wherein:
obtaining the digitally signed indication comprises prompting for the user to provide a password that is unique to the network peripheral device in response to inserting the network peripheral device; and
enabling the user to operate the network peripheral device is conditioned on successful receipt of the password.

20. A non-transitory computer-readable medium comprising one or more computer-readable instructions that, when executed by at least one processor of a computing device, cause the computing device to:
detect that a user is attempting to operate a network peripheral device configured for connecting into a base network device, at least one of the network peripheral device and the base network device comprising a trusted platform module that further comprises an endorsement key that identifies the trusted platform module;
obtain an indication that the user is authorized by a vendor to operate the network peripheral device connected into the base network device where:
the indication is digitally signed by the vendor;
the vendor comprises a vendor for at least one of the network peripheral device and the base network device; and
the indication indicates that the vendor has authorized a match between at least one of:
the user and the endorsement key; and
the network peripheral device and the base network device; and
enable the user to operate the network peripheral device based on obtaining the digitally signed indication that the user is authorized by the vendor to operate the network peripheral device.

* * * * *